United States Patent [19]
Rehwinkel et al.

[11] Patent Number: 5,399,179
[45] Date of Patent: Mar. 21, 1995

[54] DEVICE FOR FILTERING DUST FROM GAS

[75] Inventors: Heiko Rehwinkel, Bottop; Friedrich Klauke, Ratingen; Dieter König, Hattingen; Günther Dehn, Wesel, all of Germany

[73] Assignee: Lurgi Lentjes Babcock Energietechnik GmbH, Düsseldorf, Germany

[21] Appl. No.: 176,068

[22] Filed: Jan. 3, 1994

[30] Foreign Application Priority Data

Apr. 30, 1993 [DE] Germany .................. 43 14 316.4

[51] Int. Cl.⁶ .............................................. B01D 46/00
[52] U.S. Cl. ...................................... 55/341.1; 55/523
[58] Field of Search ..................... 55/341.1, 505, 506, 55/507, 523; 95/273

[56] References Cited

U.S. PATENT DOCUMENTS

| | | | |
|---|---|---|---|
| 2,804,168 | 8/1957 | Church | 55/523 |
| 4,735,635 | 4/1988 | Israelson et al. | 55/523 |
| 4,735,638 | 4/1988 | Ciliberti et al. | 55/302 |
| 4,969,937 | 11/1990 | Tassicker | 55/523 |
| 5,059,227 | 10/1991 | Kilicaslan et al. | 55/523 |
| 5,296,010 | 3/1994 | Clark et al. | 55/523 |

FOREIGN PATENT DOCUMENTS 3-293010  12/1991  Japan .................. 55/523

*Primary Examiner*—Charles S. Bushey
*Attorney, Agent, or Firm*—Max Fogiel

[57] ABSTRACT

An arrangement for filtering dust from hot gas, in which a housing is provided with a dirty-gas zone and a clean-gas zone, as well as porous-walled hollow structures that are continuous with the exception of an outlet opening into the clean-gas zone. A filtering tube surrounds the outlet and has an area with spherically convex base that rests against a support fixed in the clean-gas zone. Between the base of the tube and the support, there is an annular adapter which has a coefficient of linear heat expansion that is approximately at least that of the tube. The annular adapter rests against the convex base of the tube, and has a flat surface that rests against a matching flat surface on the support, so that the adapter can slide horizontally over the support that is fixedly connected to the clean-gas zone. The sliding of the adapter relative to the support occurs over oppositely-lying flat parallel surfaces, one of which is on the support and the other is on the adapter. The support and the adapter are free to expand in all directions due to the sliding action that is made possible.

3 Claims, 4 Drawing Sheets

DEVICE FOR FILTERING DUST FROM GAS

BACKGROUND OF THE INVENTION

The present invention concerns a device for filtering dust from gas, especially a hot gas, by using tubes.

Devices of this genus are known for example from German OS 3 408 627, German Patent 3 515 365, and European Application Exposure 0 428 862. The ceramic tubes hang down in these devices. They rest by way of a flat or convex interface on an accommodation on a perforated base. The advantage of the convex joint is that it allows the tube to slant slightly in operation without detriment to the seal between the dirty-gas zone and the clean-gas zone. The ceramic tubes in the device known from the European exposure, rest on metal accommodations welded to a dirty-gas channel. The mutually contacting surfaces of both the tube and the accommodation are concave and convex. Since the ceramic that the tube is made of and the metal that the accommodation is made of have different coefficients of heat expansion, however, the contact surfaces can become distorted. This situation makes it impossible to ensure absolute tightness at high temperatures, and the requisite level of dust elimination cannot always be attained. The same difference in heat-expansion coefficients may generate enough stress in the contact surfaces to crack the tube.

Inserting mineral seals between the ceramic tube and the metal accommodation in order to compensate for the difference is known from the aforesaid exposure and from U.S. Pat. No. 4,735,638. Since such seals are made of loosely compacted fibers, however, they cannot unless specially adapted withstand the conditions that accompanies the operation of such a gas filter. These conditions are characterized by rapid alterations between the pressure inside the tube and that of the atmosphere around it. The special adaptations comprise springs or stuffing-boxes between the tube and the accommodation. Such structures make the device more expensive, and complicate installing and removing the tubes.

Also known (from German OS 4 126 320 and OS 4 126 324) are adapters that fit into the accommodation and are sealed off with resilient seals. Resilient seals of organic materials, however, do not resist heat very well and will burn or pyrolyze, depending on how hot the gas is and how much oxygen it contains.

SUMMARY OF THE INVENTION

The object of the present invention is accordingly a dust-tight means of connecting a ceramic filter tube to a metal accommodation (support) in a clean-gas zone that does not involve a resilient seal, that can withstand rapid alterations between the pressure inside the tube and that of the atmosphere around it, especially at high temperatures, and that will be easy to install and remove.

The interposition of an annular adapter with the same coefficient of linear thermal expansion as the tube ensures that both curved contact surfaces have the same coefficient. The tube will accordingly be able to tilt around the accommodation enough to adjust to manufacturing and installation tolerances. Since on the other hand the adapter's coefficient will differ from that of the metal accommodation, the contact surfaces at that point will have to be flat to prevent the two parts from rotating together to the detriment of tightness.

BRIEF DESCRIPTION OF THE DRAWINGS

Several embodiments of the invention will now be specified with reference to the drawing, wherein.

DESCRIPTION OF THE PREFERRED EMBODIMENTS

Figure 1:
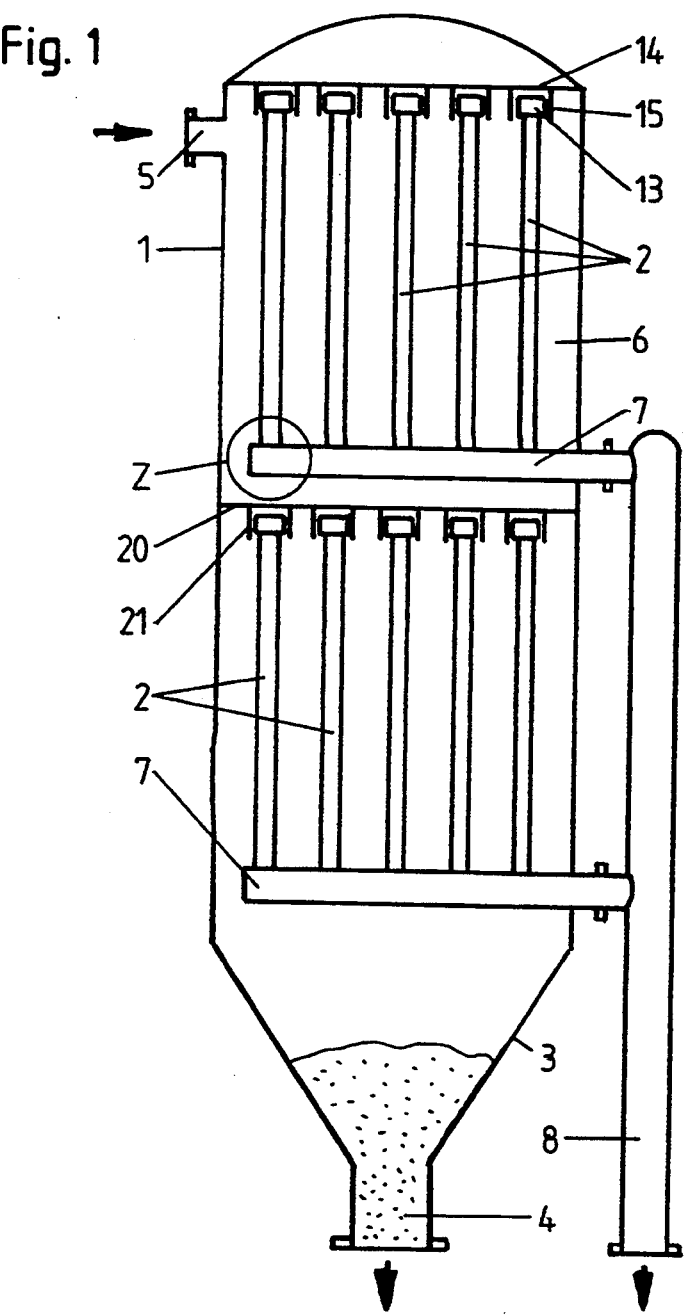
FIG. 1 is a schematic longitudinal section through a device for filtering gases.

A device for filtering dust from gas, especially hot gas, comprises a cylindrical housing 1 that accommodates filter tubes 2. The bottom of housing 1 is a funnel-shaped hopper 3. The funnel collects the precipitated dust and terminates in an outlet 4 for removing the dust. Housing 1 also has an intake 5 for the dirty gas.

Figure 2:
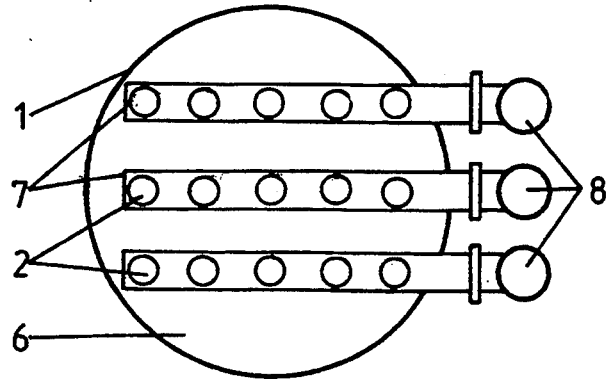
FIG. 2 is a top view of the device illustrated in FIG. 1.
Figure 3:
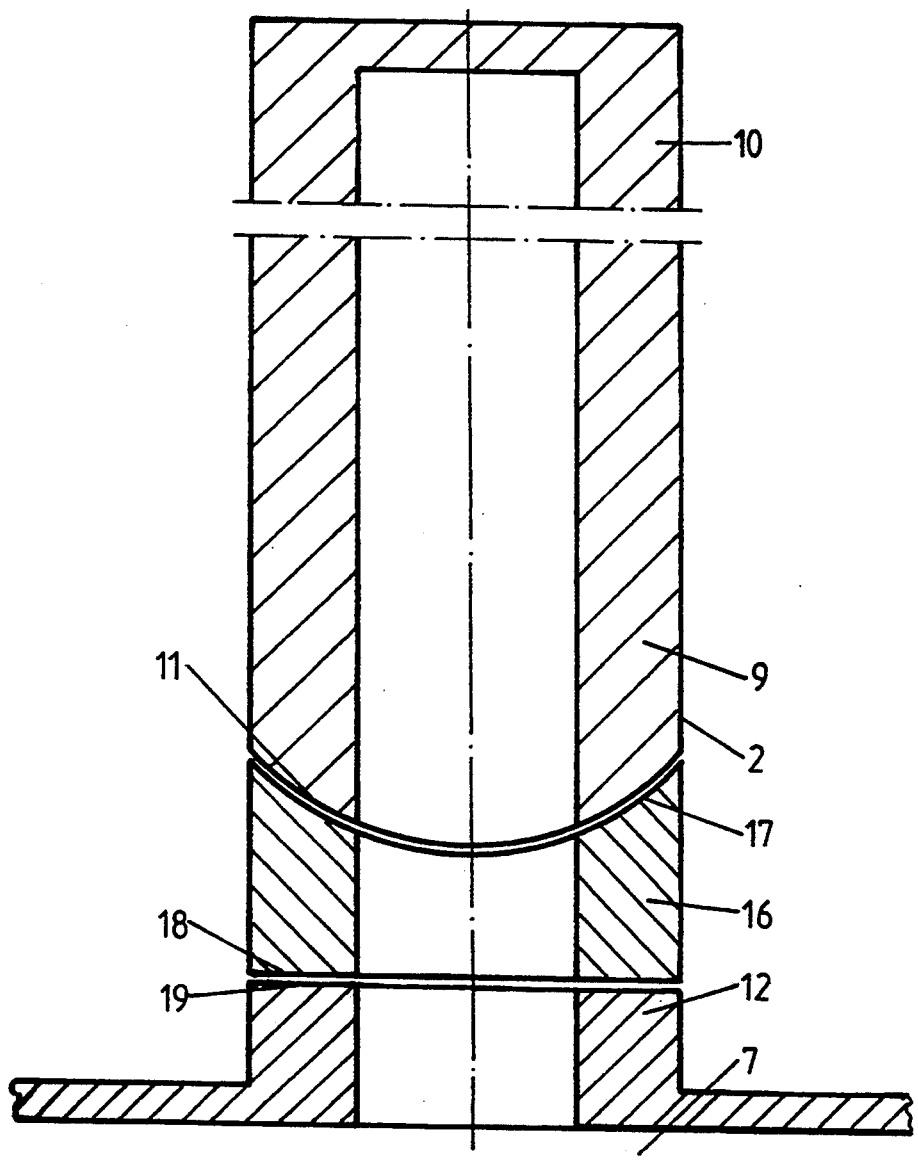
FIG. 3 is a detail of the area Z in FIG. 1.

The device is separated into a dirty-gas zone, and a clean-gas zone. The dirty-gas zone is constituted by the interior 6 of housing 1 and the clean-gas zone, in the embodiment illustrated in FIGS. 1 and 2 by headers 7. Headers 7 are accommodated inside housing 1 and extend out through its wall to clean-gas removal lines 8. There are several headers 7 on several levels.

Each tube 2 consists of a hollow structure 9 with a porous, preferably ceramic, wall. They can also be of metal or a metallic compound. Each hollow structure 9 is a prism with any desired outer contour and a preferably cylindrical inner surface. One end of each hollow structure 9 has a cap 10 and the other end is left open.

Tubes 2 are accommodated in housing 1 with the outer surface of each hollow structure 9 facing the dirty-gas zone and with its interior communicating with the clean-gas zone. The area surrounding the exit from each tube 2 constitutes a base 11. The tubes 2 depicted in FIGS. 1 through 4 rest with their caps 10 up and their bases 11 down on an annular accommodation (support) 12 in the clean-gas zone subject to gravity alone. Tightness can be increased by adding weights 13 to the tops of tubes 2. The capped ends of tubes 2 fit loosely into holders 15 mounted on the bottom of a roof 14.

Extending through annular accommodation 12 is a passage with a diameter matching the inside diameter of tube 2. Each accommodation 12 is metal and is welded to headers 7.

The base 11 of tube 2 is rotation-symmetrical and preferably spherically convex. Interposed between tube 2 and accommodation 12 is an adapter 16. Adapter 16 is made of a material with at least approximately the same coefficient of linear heat expansion as the material tube 2 is made of. Adapter 16 is in fact preferably made of the same material as tube 2. The surface 17 of adapter 16 that is in contact with tube 2 is concave and fits the base 11 of the tube.

The contacting surfaces 18 and 19 are flat and parallel and fit tight together. Tubes 2 and weights 13 are heavy enough to force contacting surfaces 18 and 19 together so tight that no dust can penetrate between them. Each adapter 16, however, can still slide relatively readily over each accommodation 12 in both horizontal dimensions at the interface between contacting surfaces 18 and 19. This freedom of motion accommodates in all three dimensions any stress deriving from any differences in the coefficients of heat expansion of the different materials involved. Still, since the flatness and parallelity of the joint is maintained, it will remain dust-tight even at high temperatures and during wide variations in temperature.

Figure 4:
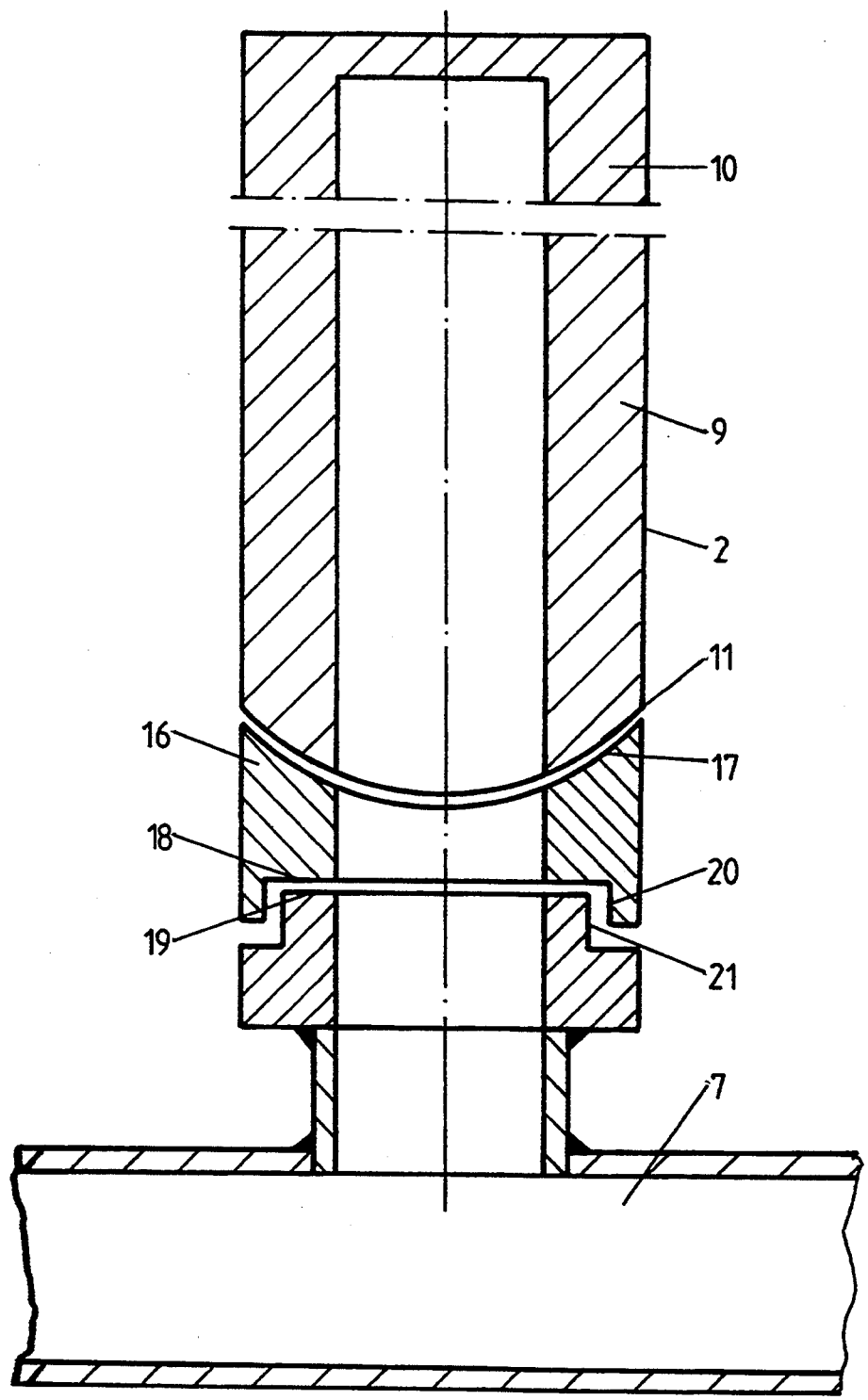
FIG. 4 is a detail of another embodiment of area Z.

Both the accommodation 12 and the adapter 16 illustrated in FIG. 4 are provided with an annular shoulder 20 and 21. One shoulder 20 is approximately or precisely far enough away from the other shoulder 21 to compensate for any expansion in adapter 16 and accommodation 12 that may occur due to heat while the device is in operation.

Figure 5:
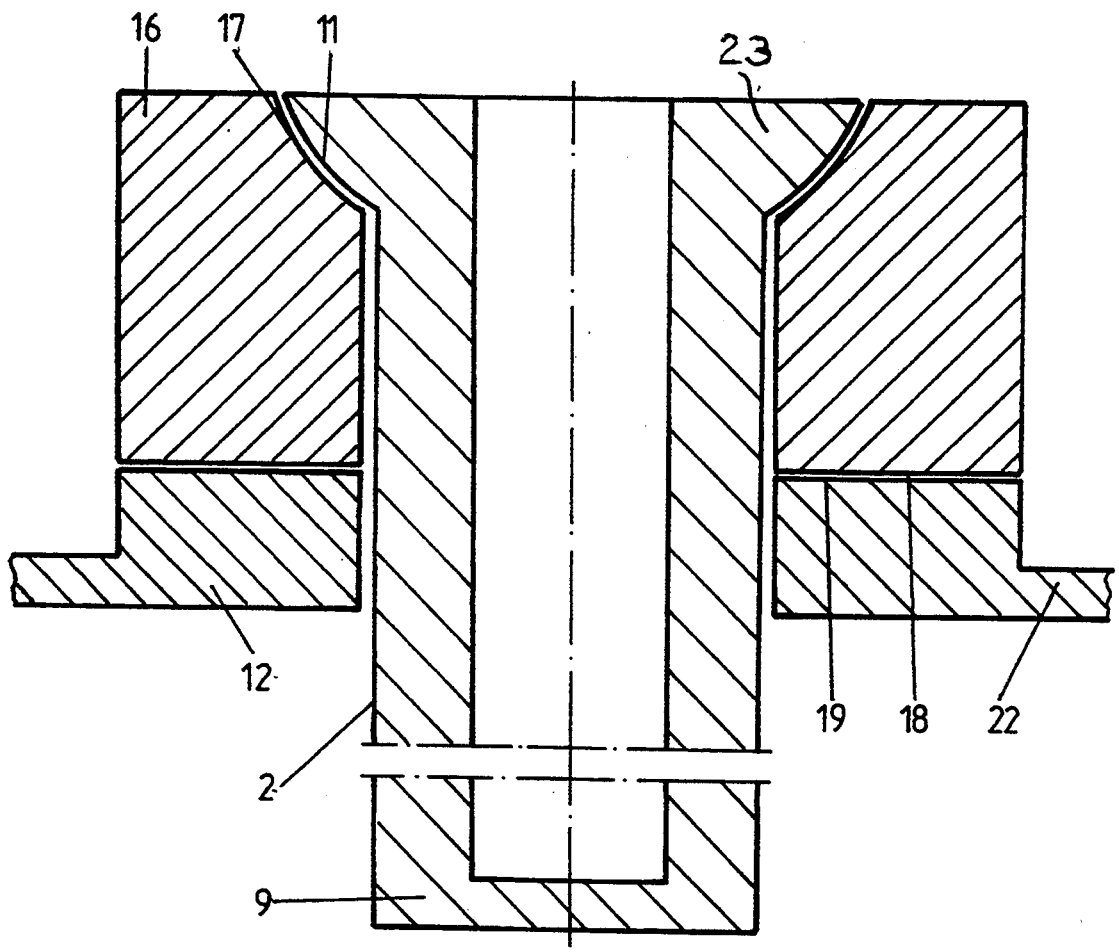
FIG. 5 illustrates a suspended filter tube.

FIG. 5 illustrates a tube 2 loosely suspended from a perforated slab 22. Slab 22 separates the device's dirty-gas zone from its clean-gas zone and has accommodations 12 distributed over it. The top of each tube 2 is open and provided with a collar 23. The collar rests by way of a spherically curved convex surface against a matching concave surface 17 on adapter 16. The contacting surfaces 18 and 19 of adapter 16 and accommodation 12 are also flat and parallel in this embodiment of the device.

We claim:

1. Apparatus for filtering dust from hot gas, comprising: a housing with a dirty-gas zone and a clean-gas zone and having porous-walled hollow structures that are continuous with the exception of an outlet opening into the clean-gas zone; a support fixed in said clean-gas zone; a tube surrounding said outlet and having an area with spherically convex base resting against a support in said clean-gas zone; an annular adapter between a base of said tube and said support and having a coefficient of linear heat expansion approximating at least that of said tube, said annular adapter fitting and resting against said convex base of said tube, said annular adapter having another flat surface resting against a matching flat surface on said support so that said adapter can slide horizontally over said support fixedly connected to said clean-gas zone, sliding of said adapter relative to said support occurring over oppositely-lying flat parallel surfaces, one of said flat parallel surfaces being on said support and the other of said flat parallel surfaces being on said adapter, said support and said adapter being free to expand in all directions due to said sliding and different heat expansions being stress-free, said flat parallel surfaces remaining parallel and in contact during said heat expansions for generating air-tightness between said flat parallel surfaces also at high temperatures and large temperature variations.

2. Apparatus for filtering dust from hot gas, comprising: a housing with a dirty-gas zone and a clean-gas zone and having porous-walled hollow structures that are continuous with the exception of an outlet opening into the clean-gas zone; a support fixed in said clean-gas zone; a tube surrounding said outlet and having an area with spherically convex base resting against a support in said clean-gas zone; an annular adapter between a base of said tube and said support and having a coefficient of linear heat expansion approximating at least that of said tube, said annular adapter fitting and resting against said convex base of said tube, said annular adapter having another flat surface resting against a matching flat surface on said support so that said adapter can slide horizontally over said support; said adapter and said support having mutually facing annular shoulders with a distance between said shoulders, said distance between said shoulders being at least equal to the greatest possible horizontal distance between the heat expansions of said adapter and said support.

3. Apparatus for filtering dust from hot gas, comprising: a housing with a dirty-gas zone and a clean-gas zone and having porous-walled hollow structures that are continuous with the exception of an outlet opening into the clean-gas zone; a support fixed in said clean-gas zone; a tube surrounding said outlet and having an area with spherically convex base resting against a support in said clean-gas zone; an annular adapter between a base of said tube and said support and having a coefficient of linear heat expansion approximating at least that of said tube, said annular adapter fitting and resting against said convex base of said tube, said annular adapter having another flat surface resting against a matching flat surface on said support so that said adapter can slide horizontally over said support fixedly connected to said clean-gas zone, sliding of said adapter relative to said support occurring over oppositely-lying flat parallel surfaces, one of said flat parallel surfaces being on said support and the other of said flat parallel surfaces being on said adapter, said support and said adapter being free to expand in all directions due to said sliding and different heat expansions being stress-free, said flat parallel surfaces remaining parallel and in contact during said heat expansions for generating air-tightness between said flat parallel surfaces also at high temperatures and large temperature variations; said tube being ceramic and said clean-gas zone being metallic, thermal stresses being avoided through the coefficients of linear heat expansion and clamping said convex base of said tube to said support is avoided, an air-tight connection being maintained between said ceramic tube and said metallic clean-gas zone.

* * * * *